United States Patent [19]

Depperman

[11] Patent Number: 5,203,197

[45] Date of Patent: Apr. 20, 1993

[54] CLAMP ASSEMBLY

[75] Inventor: Warren B. Depperman, Camden, S.C.

[73] Assignee: Cogsdill Tool Products, Inc., Camden, S.C.

[21] Appl. No.: 746,863

[22] Filed: Aug. 19, 1991

[51] Int. Cl.$^5$ .............................................. B21D 41/00
[52] U.S. Cl. ..................................... 72/402; 72/450; 29/283.5
[58] Field of Search ................ 72/402, 450, 451, 393, 72/121; 29/283.5

[56] References Cited

U.S. PATENT DOCUMENTS

| | | | |
|---|---|---|---|
| 3,512,388 | 5/1970 | Donavan | 72/451 |
| 3,602,031 | 8/1971 | Graff | 72/393 |
| 3,620,067 | 11/1971 | Ross | 72/451 |
| 3,952,936 | 4/1976 | Dearman | 228/49 |
| 4,140,001 | 2/1979 | Moulton | 72/451 |
| 4,229,963 | 10/1980 | Savinov | 72/450 |
| 4,492,015 | 1/1985 | Dearman | 29/281.5 |
| 4,578,982 | 4/1986 | Schrock | 72/451 |
| 4,586,647 | 5/1986 | Dearman | 228/49.3 |
| 4,623,085 | 11/1986 | Dearman | 228/49.3 |
| 4,644,777 | 2/1987 | Kumeth | 72/450 |
| 4,666,138 | 5/1987 | Dearman | 269/43 |
| 4,727,742 | 3/1988 | Weaver | 72/450 |
| 4,890,473 | 1/1990 | Westerman et al. | 72/402 |

FOREIGN PATENT DOCUMENTS

| | | | |
|---|---|---|---|
| 437561 | 1/1975 | U.S.S.R. | 72/402 |
| 683874 | 9/1979 | U.S.S.R. | 228/49.3 |
| 695756 | 11/1979 | U.S.S.R. | 72/402 |
| 893377 | 1/1982 | U.S.S.R. | 72/402 |

*Primary Examiner*—Daniel C. Crane
*Attorney, Agent, or Firm*—Harness, Dickey & Pierce

[57] ABSTRACT

A clamp that encircles the outer rim of an out-of-round workpiece such as a deformed tubular pipe to reform the cross-section of same into one that is substantially round, the clamp including a frame, a plurality of pivotally mounted force applying assemblies each having a force applying member to engage the workpiece, and drive means for pivoting all of the force applying assemblies simultaneously such that the force applying members are simultaneously and uniformly repositioned radially inwardly and outwardly relative to a circle defining the locus of pivot axes for the force applying members, the force applying members being adapted to close into a circle having a diameter sized to engage the workpiece when inserted therein.

25 Claims, 5 Drawing Sheets

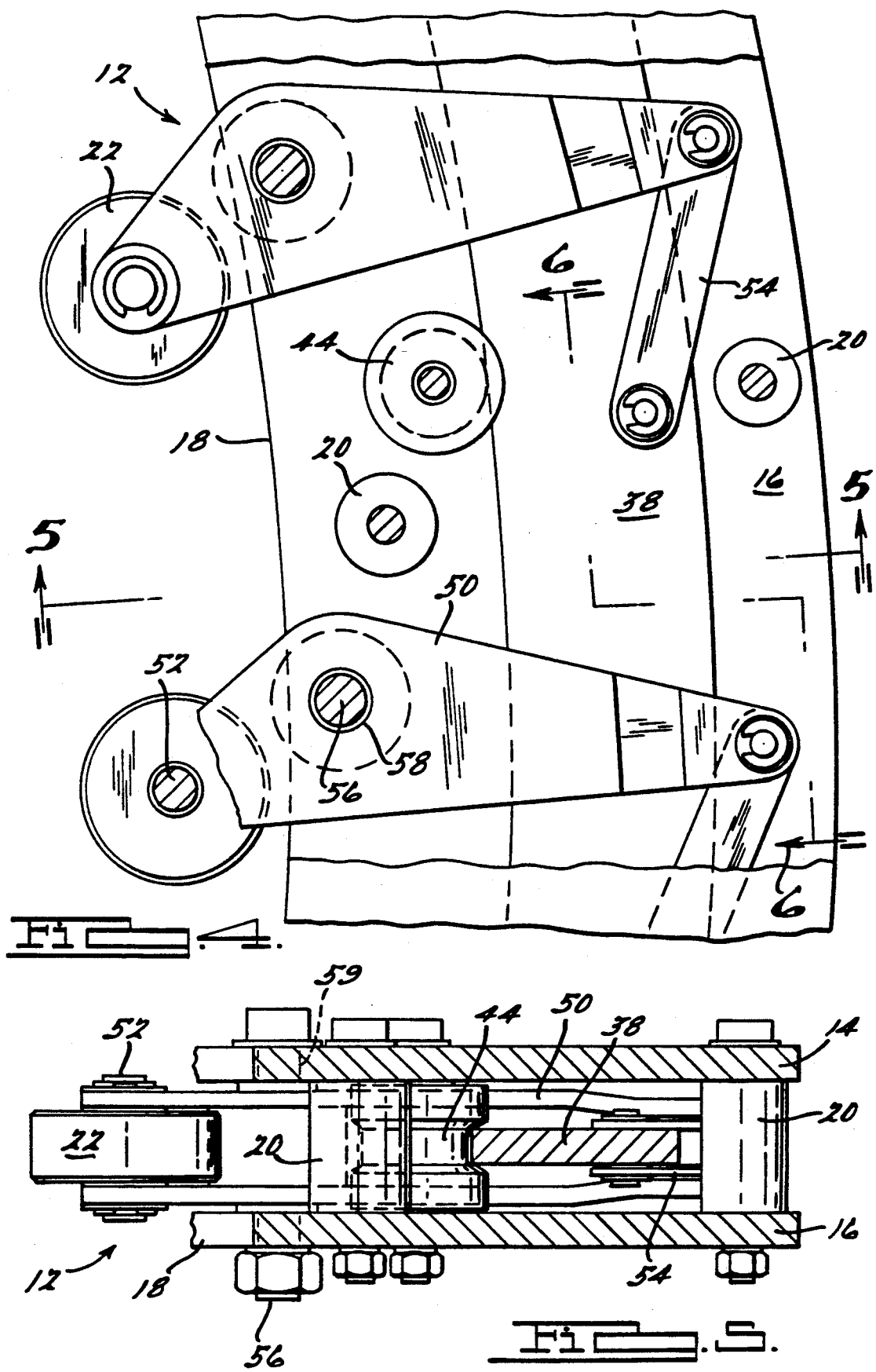

CLAMP ASSEMBLY

BACKGROUND AND SUMMARY OF THE INVENTION

This invention relates to a clamp provided with force applying members adapted to be positioned in encircling relation about the rim of a workpiece, such as a pipe or cylindrical vessel, having a noncircular cross-section to reform the same to a circular cross-section and, in particular, to a clamp which simultaneously expands and/or contracts the force applying members in such a manner that they rotate from a non-engaging first position defining a first circle to a workpiece engaging second position defining a second circle.

Pipe or cylindrical vessel fit-up clamps commonly use a large number of individual adjusting screws each having its axis aligned with a radius extending from a longitudinal axis generally representing the central axial axis of the workpiece. Such an arrangement is shown in U.S. Pat. No. 3,952,936 issued Apr. 27, 1976. Separately adjusting these screws can be very time-consuming and even with great care it may be impossible to get a workpiece truly round. Further, these screws cannot be rapidly reset for another workpiece since the screws must be individually adjusted to a new diameter. As shown in U.S. Pat. No. 4,890,473 issued Jan. 2, 1990, a clamp was subsequently developed that utilized multiple series of force applying members that simultaneously pivot to engage a workpiece, however, this clamp utilized a complicated chain driven worm gear for individually pivoting each series of force applying members into engagement. Although this was an improvement over individually adjusting screws, uniform clamping engagement was still unable to be achieved. Thus, it would be desirable to have a clamp in which all force applying members are actuated simultaneously in unison by a single driving mechanism that is uncomplicated and easily operated and maintained.

In the present invention, the clamp has a frame comprising a pair of rigid stationary rings, each having a circular inside opening defined by a diameter greater than the exterior diameter of the workpiece to be encircled. The clamp also has a plurality of generally equiangularly spaced, force applying assemblies that are pivotally coupled between the rings and each having a force applying member. The present invention further comprises a novel drive arrangement for simultaneously driving all of the force applying members into and out of forcible engagement with the workpiece. This improved drive arrangement utilizes a unique drive ring, disposed between the pair of stationary rings, that is pivotally coupled to all of the force applying assemblies. The inner radial surface of this drive ring engages with spool shaped rollers, that are located between the force applying assemblies, thereby retaining the drive ring while permitting the drive ring to be axially rotated relative to the stationary rings. Rotating the drive ring causes one end of the force applying assemblies coupled thereto to be displaced, further causing the opposite end of the force applying assemblies to pivot into or out of forcible engagement with the workpiece. Rotation of the drive ring is accomplished by hydraulic actuators which are coupled to the rigid stationary rings at one end and to the drive ring at an opposite end. A hydraulic control system energizes these hydraulic actuators in unison, causing the drive ring to axially rotate, thereby causing the force applying assemblies to be simultaneously pivoted. Thus, the force applying members are simultaneously rotated into or out of forcible engagement with the workpiece, providing for uniform displacement of the force applying members.

An advantage of such a clamp is the ability to achieve roundness in a workpiece to be welded with a minimum of effort but with a maximum diametral accuracy and to accommodate workpieces of different diameters within the range of the clamp.

Another advantage of the clamp having a contracting opening is that a multitude of force applying members can be simultaneously and uniformly adjusted by a single driving means to positions such that each force applying member is always positioned tangent to a circle. Furthermore, this positioning can be controlled with great precision over the entire range of diameters by a hydraulic control system.

Yet another advantage of the present invention is the ease with which all force applying members of the clamp can be simultaneously rotated into and out of engagement with the workpiece by a novel, yet uncomplicated, driving arrangement that is controlled by an easily operated and maintained hydraulic control system.

Additional advantages and features of the present invention will become apparent from the subsequent description and claims taken in conjunction with the accompanying drawings.

BRIEF DESCRIPTION OF THE DRAWINGS

FIG. 4 is a fragmentary enlarged elevational view of a portion of the clamp of the present invention;

FIG. 5 is a cross sectional view taken along section 5—5 in FIG. 4;

DETAILED DESCRIPTION OF THE PREFERRED EMBODIMENT

Figure 1:
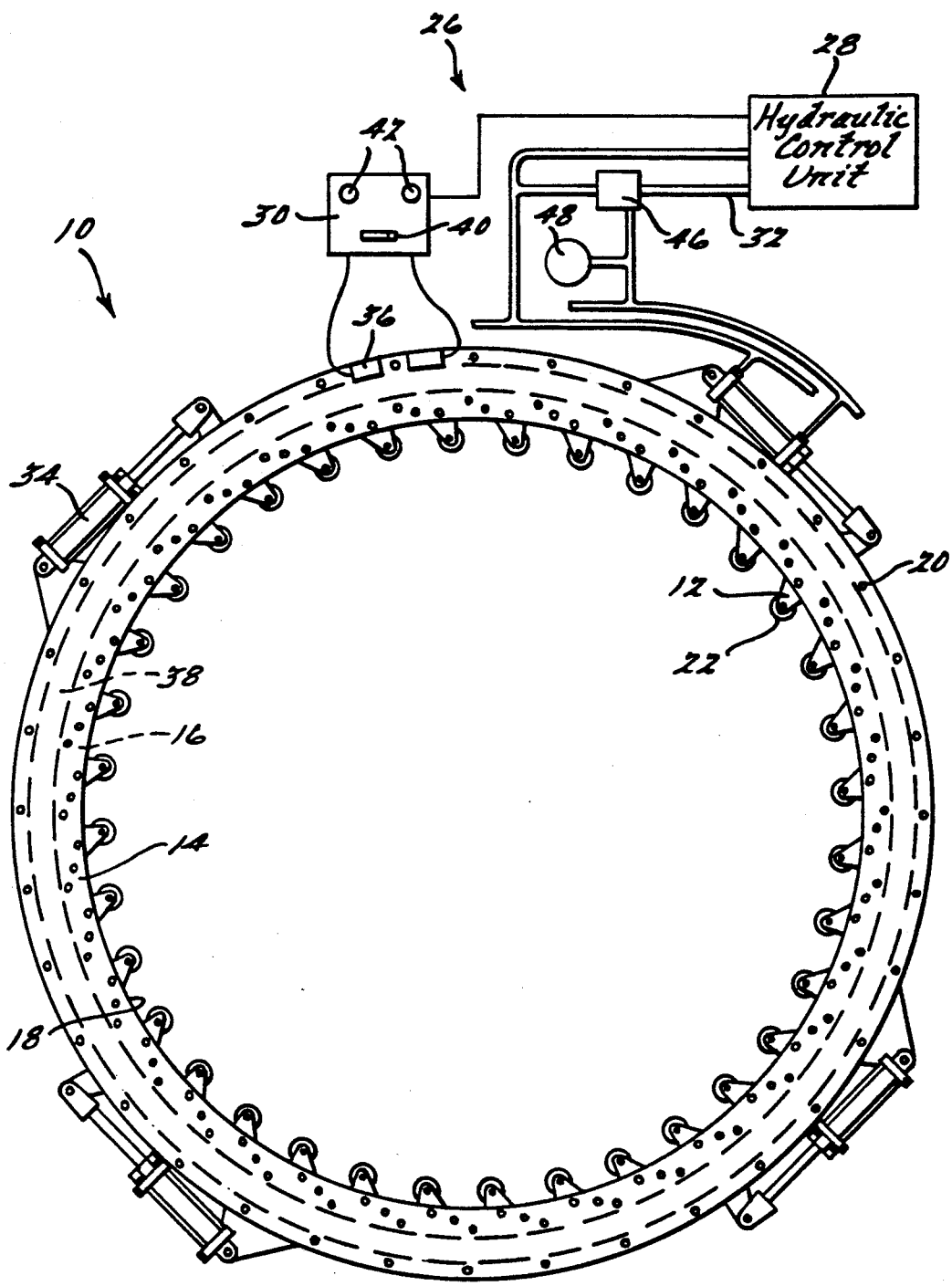
FIG. 1 is an elevational view of a clamp in accordance with the principles of the present invention, including a schematic view of the hydraulic control system.

Turning now to the drawings, particularly FIG. 1, a contracting rim clamp 10 comprises a plurality of force applying assemblies 12 each being pivotally mounted between a pair of relatively stationary, thick, flat, annular rings 14 and 16. The rings 14 and 16 form a clamp frame having a circular interior opening 18 defined by a diameter "B" adapted to encircle the rim of a workpiece such as that shown in FIGS. 2 and 3. The structural integrity of this frame depends on the rings 14 and 16 being strong enough to resist radial distortion when subjected to the forces transferred by the force applying assemblies 12. The structural integrity of the frame is also dependent upon there being sufficiently strong spacers 20 that extend between the two rings 14 and 16 to physically hold them together. The spacers 20 additionally provide for accurate lateral separation between the rings 14 and 16 so that the force applying assemblies 12 can be readily mounted to the frame.

As further depicted in FIG. 1, each force applying assembly 12 has a force applying member 22 mounted at one distal end that is adapted to be pivoted into forcible engagement with the rim of the workpiece. Preferably the force applying member 22 is cylindrically shaped. The force applying member could also comprise a shoe-like member (not shown) that is formed with an arcuate surface configured to fit the exterior curvature of the workpiece.

Figure 2:
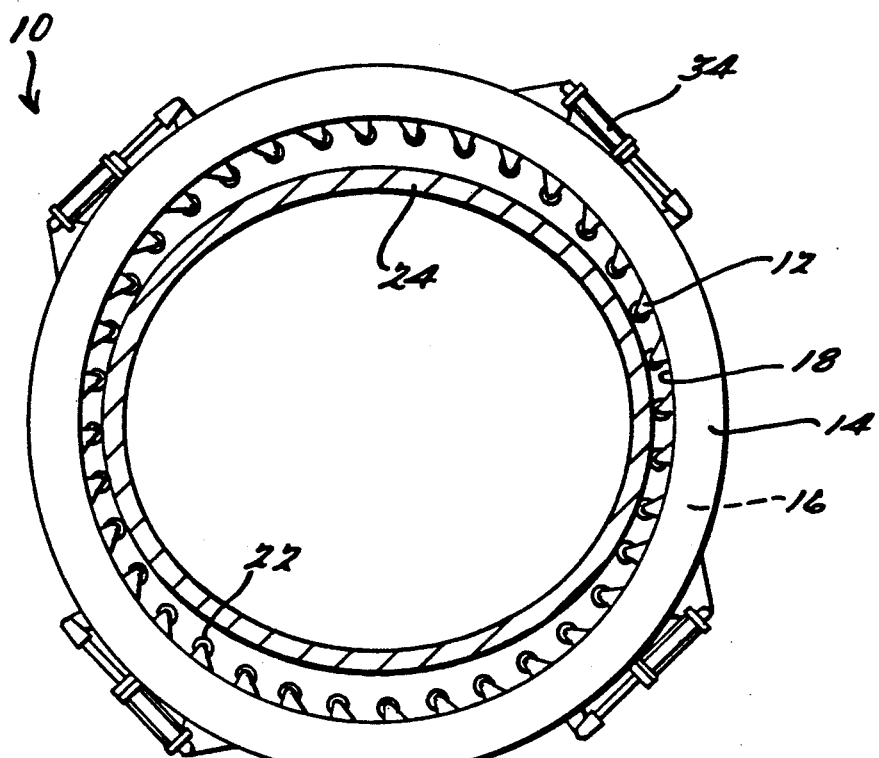
FIG. 2 is an elevational view of a clamp in accordance with the present invention showing an out of round workpiece (in section) being encircled and initially engaged by some of the force applying members.
Figure 3:
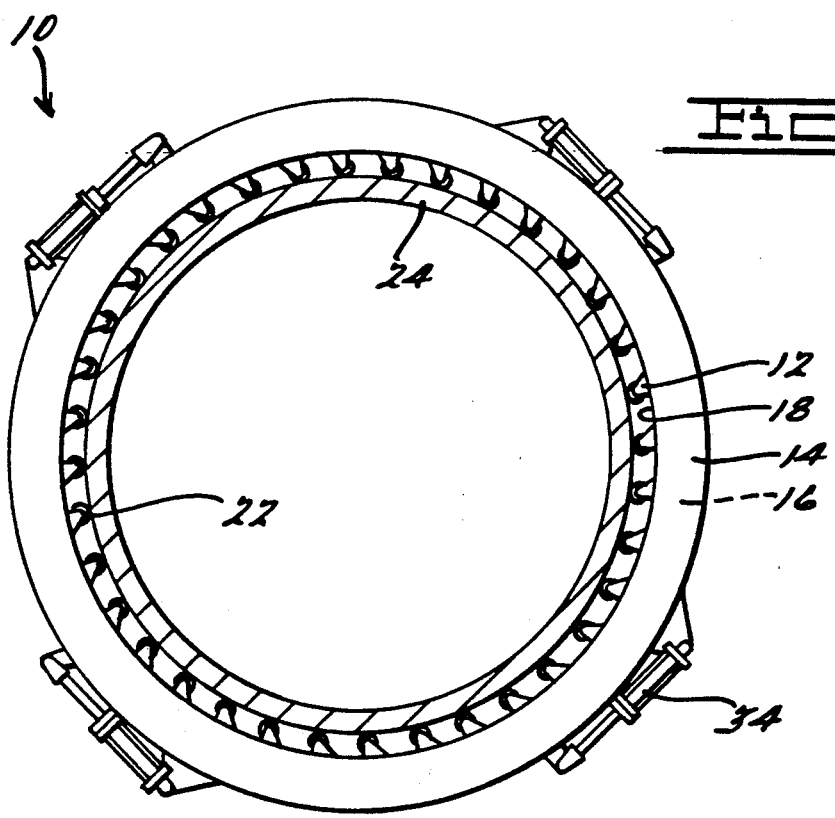
FIG. 3 is an elevational view similar to FIG. 2, of a clamp in accordance with the present invention showing the force applying members encircling the workpiece (in section)

FIG. 2 shows the clamp 10 being positioned about an out-of-round workpiece 24 with some of the force applying members 22 being in forcible engagement with the rim of the workpiece 24 and other of the force applying members 22 being out of contact with the rim of the workpiece 24. FIG. 3 shows the force applying assemblies 12, after being pivoted to a radially inward position, with all of the force applying members 22 in forcible engagement with the rim of the workpiece 24, thereby reforming the rim to a circular cross section. The force applying assemblies 12 are simultaneously pivoted through the same angle "A" relative to a radius passing through the center "C" of the pivot axis of the respective force applying assembly 12. Furthermore, the locus of points described by the force applying members 22, at any position after rotation, will define a circle the center of which is generally the central axial axis of both the workpiece 24 and the clamp assembly 10.

Figure 7:
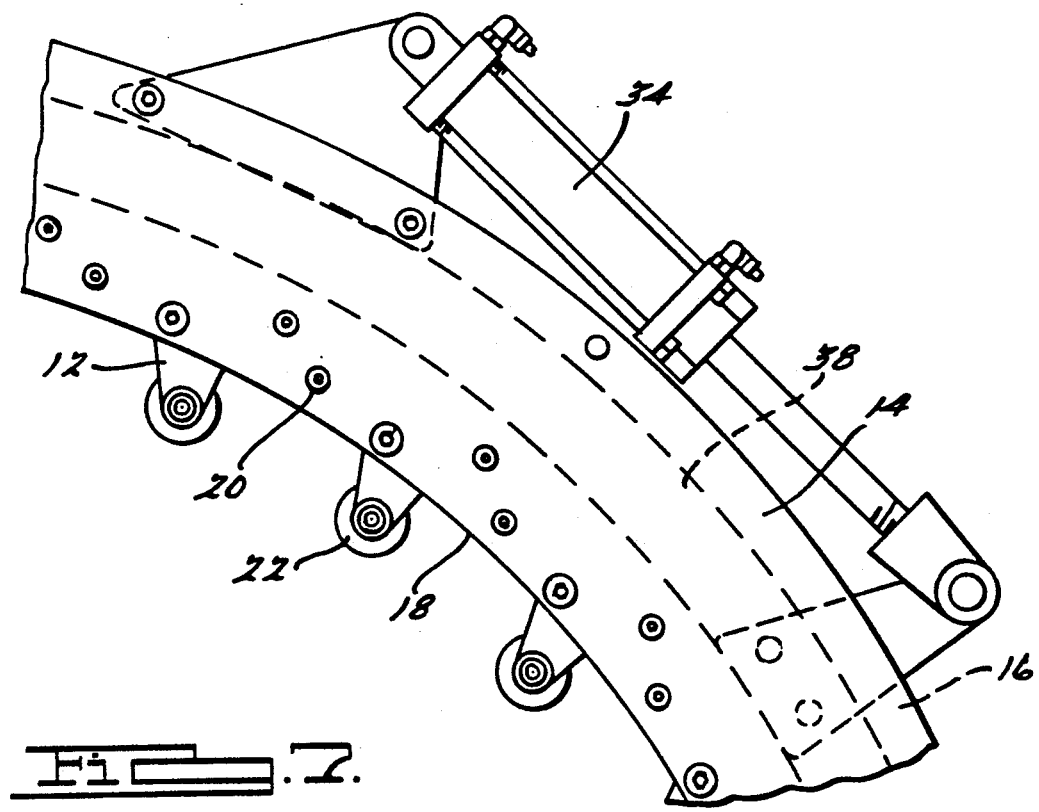
FIG. 7 is a fragmentary plan view of a portion of the clamp of the present invention.
Figure 8:
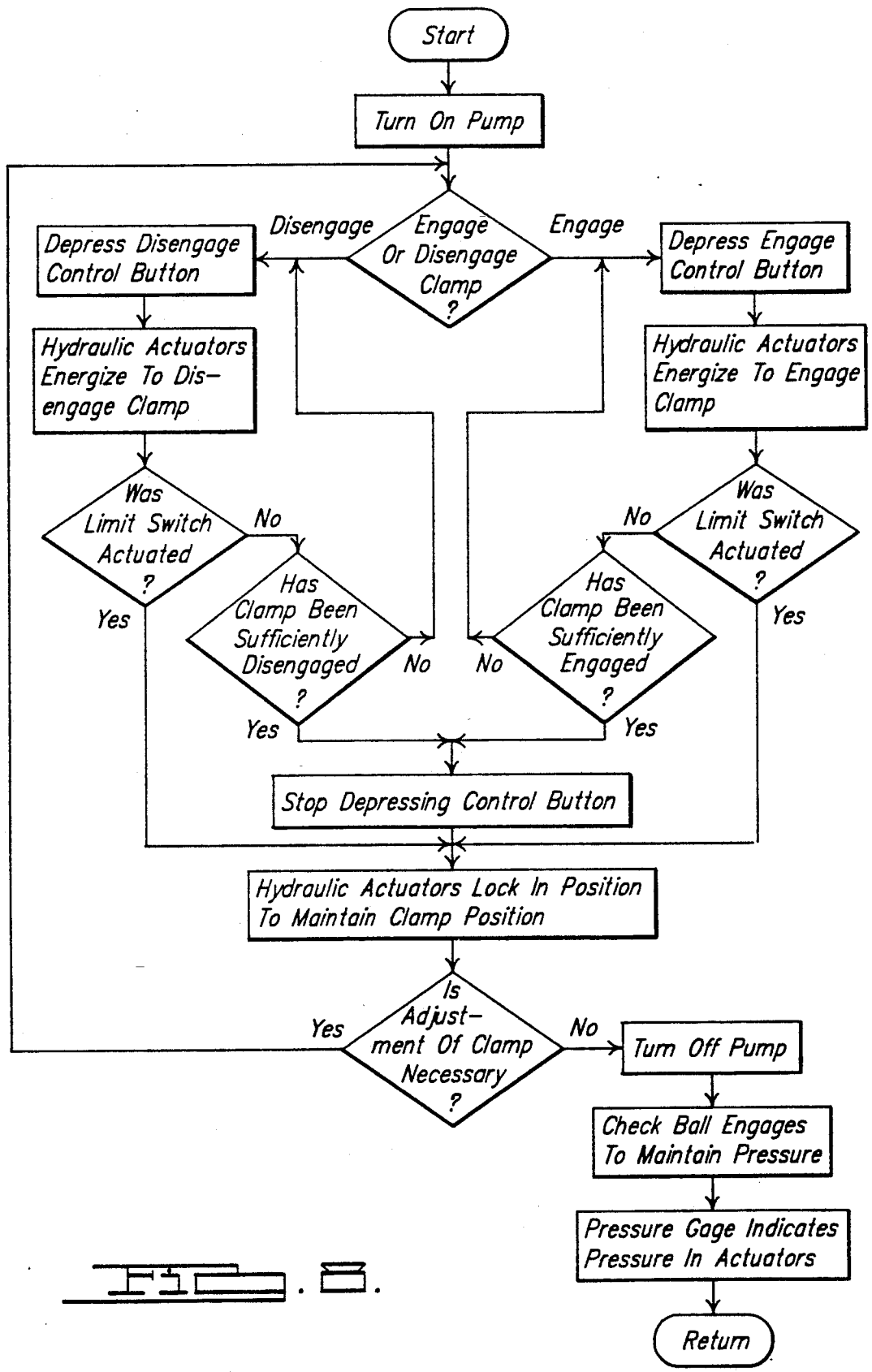
FIG. 8 is a flowchart illustrating the process utilized when operating the hydraulic control system of the clamp of the present invention.

Referring again to FIG. 1, a single actuating means for simultaneously actuating each of the force applying assemblies 12 into and out of forcible engagement with the workpiece is shown. This actuating means is preferably comprised of a hydraulic control system 26 having a control unit 28, a control panel 30, a hydraulic network 32, four hydraulic actuators 34 and two adjustable limit switches 36. The control system 26 is ultimately used to operate the hydraulic actuators 34 which have one end connected to the relatively stationary rings 14 and 16 and an opposite end connected to a drive ring 38, as shown in FIG. 7. As best described by the flowchart in FIG. 8, this actuating means is generally operated by turning a pump switch 40 on the control panel 30 to the on position to actuate a pump included in the control unit 28. The operator then depresses either the engage or disengage button 42 on the control panel 30 to send a signal to the control unit 28, which responds by pressurizing a corresponding engage or disengage hydraulic line 32. In turn, the hydraulic actuators 34 are actuated to either engage or disengage the clamp 10 by forcing the drive ring 38 to rotate in one direction or the other.

Figure 6:
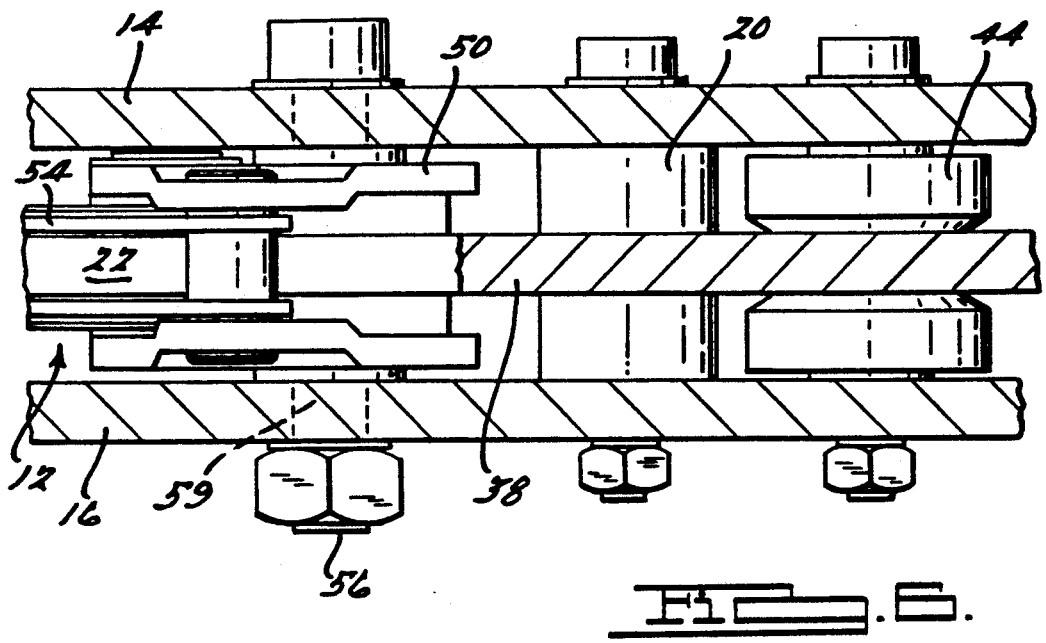
FIG. 6 is a cross sectional view taken along section 6—6 in FIG. 4.

The drive ring 38 is concentrically disposed between the pair of relatively stationary rings 14 and 16 and is pivotally coupled to each of the force applying assemblies 12. The drive ring 38 is retained between the relatively stationary rings 14 and 16 by engagement of its inner radial surface with spool shaped rollers 44 disposed between the relatively stationary rings 14 and 16. This arrangement, as best shown in FIGS. 4, 5 and 6, allows the hydraulic actuators 34 to rotate the drive ring 38 axially in either direction upon the rollers 44 with respect to the central axial axis of the rings 14 and 16, thereby simultaneously displacing one end of each force applying assembly 12 and causing the opposite end of each force applying assembly 12 to be simultaneously pivoted into or out of engagement with the workpiece 24.

Note that the hydraulic control system 26 used to rotate the drive ring 38 additionally utilizes a check ball 46 and a pressure indicator 48. When the operator stops depressing either of the control buttons 42, the check ball 46 engages to retain the pressure in the hydraulic actuators 34 which is continuously indicated by the pressure indicator 48. This prevents the force applying assemblies 12 from relaxing by locking the actuators 34, and thus the drive ring 38, in position. One should also note that two conventional adjustable limit switches 36 are utilized to stop the drive ring 38 when it reaches predetermined locations with respect to the relatively stationary rings 14 and 16. When triggered, the limit switches 36 send a signal to the control unit 28 that automatically stops the signal from the depressed control buttons 42, thereby stopping actuation and engaging the check ball 46 as discussed previously to lock the force applying assemblies 12 in predetermined inward or outward locations. This system can be used as a design feature or as a safety feature when clamping a workpiece 24.

The preferred configuration of a force applying assembly 12 is illustrated in FIG. 4, which shows a portion of the clamp 10 with one of the relatively stationary rings 14 removed to illustrate the force applying assembly 12 and its relationship with the drive ring 38. The cross sectional views of the force applying assemblies 12 in FIGS. 5 and 6 further illustrate this preferred configuration and together with FIG. 4 show that each force applying assembly 12 includes a pair of arms 50 each spaced apart a distance sufficient to receive and mount a force applying member 22 at its radially inwardly extending end. The force applying member 22 is mounted between the arms 50 by a pin 52, and is adapted to engage the outer periphery of the workpiece 24. The force applying assembly 12 is further comprised of a link 54 pivotally coupled at one of its ends to the radially outwardly extending end of the arms 50, and pivotally coupled to the drive ring 38 at its other end. Thus, when the drive ring 38 is rotated, the link 54 is displaced which causes the arms 50 of the force applying assembly 12 to displace. Since each force applying assembly 12 is held in place by a mounting pin 56 passing through respective holes 58 in the arms and corresponding mounting holes 59 (FIG. 5) in the rings, this displacement of the arms 50 causes each assembly 12 to rotate about its respective mounting pin 56, further causing the force applying member 22 to pivot into or out of forcible engagement with the workpiece 24.

The mounting holes in the rings are drilled on a precisely sized hole circle that is concentrically positioned about the center "C" of the central axial axis of the clamp 10 such that the force applying assemblies 12 are positioned in a circle. Thus, when the force applying assemblies 12 are simultaneously pivoted inwardly such that they are all pointed directly toward the center of the clamp 10 (i.e., are aligned with a radius passing through the central axial axis of the rings 14 and 16), the inside surface of each force applying member 22 will lie on a circle. This circle has a diameter "E" equal to the distance between the inside of any one force applying member 22 and the force applying member 22 opposite 180° thereto. This configuration defines the mathematical minimum diameter workpiece 24 that the clamp 10 can reform. If the arms 50 supporting the force applying members 22 are all simultaneously rotated outwardly through a given angle, the inside surfaces of the force applying members 22 will still lie on a circle, but the diameter of the circle will be much larger. The change in diameter is dependent on the length of the arms 50 supporting the force applying members 22 and the angle of rotation of these arms 50. In this manner, the device can contract in unison on different diameter workpieces 24 and the points of contact with the workpiece 24 (i.e., the inside surfaces of the force applying members 22) will always lie in a true circle. This allows the clamp 10 to accurately and precisely "round" out-of-round workpieces 24 having diameters that vary (within the range of the clamp) without the user having to unnecessarily make a large number of independent adjustments and without having to individually actuate multiple series of force applying assemblies.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

What is claimed is:

1. An improved clamping assembly for reforming an out-of-round, relatively thin walled workpiece, said improvement comprising:
   (a) frame means for providing a relatively stationary base, said frame means defining at least one generally circular edge portion;
   (b) a plurality of force applying assemblies, each having a rigid elongated member which has first and second end portions, each elongated member coupled to said frame means by a pivotal coupling disposed between said end portions, closer to said second end portion than said first end portion, such that said force applying assemblies are located at equal radial distances from a central axis of said at least one generally circular edge portion; and
   (c) a rigid one piece annular driving member pivotally coupled to said first end of all of said elongated members such that as said driving member is moved along an annular path, said elongated members pivot about said pivotal coupling, thereby causing said second ends of said elongated members to simultaneously pivot into and out of engagement with said workpiece to reform said workpiece.

2. The assembly of claim 1 wherein said frame means comprises a pair of thick, flat annular rings.

3. The assembly of claim 2 wherein said generally circular edge portion is comprised of a radially inner portion of said rings, and defines an opening that has an inside diameter greater than the outside diameter of said relatively thin walled workpiece.

4. The assembly of claim 1 wherein each said elongated member is mounted to the frame means by a pin intermediate of said end portions, one end portion being coupled to said driving member by a link that extends between the driving member and said end, and the other end portion being connected to a force applying member by a pin, the respective pins of said force applying assemblies being located on a circle having its center on the axis of said generally circular edge portion.

5. The assembly of claim 4 wherein said force applying member comprises a rotatably mounted, cylindrically shaped member for engaging said workpiece.

6. The assembly of claim 4 wherein said force applying member comprises a shoe-like member that is formed with an arcuate surface configured to fittingly engage the exterior curvature of said workpiece.

7. The assembly of claim 1 wherein said driving member is actuated by a hydraulic control system having a plurality of hydraulic actuators.

8. The assembly of claim 7 wherein the actuation of said hydraulic actuators is controlled by a control panel within said hydraulic control system.

9. The assembly of claim 7 wherein each of said hydraulic actuators has two ends, a first end coupled to the driving member and a second end coupled to the frame means.

10. The assembly of claim 1 wherein said clamping assembly utilizes at least one limit switch to stop said movement of said drive member, thereby stopping said force applying assemblies at predetermined positions.

11. The assembly of claim 1 wherein said clamping assembly utilizes retaining means for maintaining the position of said force applying assemblies at desired locations when said movement is ceased.

12. The assembly of claim 11 wherein said retaining means comprises a check ball mechanism.

13. An improved apparatus for actuating a plurality of force applying assemblies into and out of engagement with a workpiece, said force applying assemblies being coupled to the frame of a pipe or cylindrical vessel fit up clamp, said improved apparatus comprising:
   (a) a one piece rigid annular driving member pivotally coupled to one end of a rigid elongated member within each of said force applying assemblies, said driving member being coupled to all of said rigid elongated members, each of said elongated members being coupled to said frame by a pivotal coupling disposed at an intermediate portion of said elongated member;
   (b) actuating means for actuating said rigid driving member along an annular path such that said elongated members within said force applying assemblies are pivoted, about said pivotal coupling, into and out of engagement with said workpiece; and
   (c) means for controlling the actuation of said actuating means such that said force applying assemblies are accurately displaced into and out of engagement with said workpiece by said driving means.

14. The apparatus of claim 13 wherein said driving member is comprised of an annular ring disposed within said clamp mechanism.

15. The apparatus of claim 13 wherein said actuating means is comprised of a plurality of hydraulic actuators connected to said driving member.

16. The apparatus of claim 15 wherein said actuating means utilizes a hydraulic pump and a network of hydraulic lines to energize said hydraulic actuators.

17. The apparatus of claim 13 wherein said controlling means is comprised of a control unit, having a control panel, for communicating with said actuating means, thereby actuating said driving member upon a command entered into said control panel.

18. The apparatus of claim 13 wherein said actuating means utilizes at least one adjustable limit switch to stop the actuation of said force applying assemblies at predetermined positions.

19. The apparatus of claim 13 wherein said actuating means utilizes retaining means for maintaining the position of said force applying assemblies at desired locations when said actuation is ceased.

20. The apparatus of claim 19 wherein said retaining means comprises a check ball mechanism.

21. An improved method for reforming an out-of-round, relatively thin walled workpiece with a clamping assembly having a frame with a generally circular edge portion, a one piece rigid annular driving member and a plurality of force applying assemblies pivotally coupled to said rigid driving member and said frame, said method comprising the steps of:

(a) placing said out-of-round, relatively thin walled workpiece within said clamping assembly adjacent to said generally circular edge portion;

(b) actuating said rigid driving member with an actuating means to cause said rigid driving member to move along an annular path while causing one end of a rigid elongated member within each of said force applying assemblies to pivot about an intermediate portion of said elongated member which is pivotally coupled to said frame, thereby causing opposite ends of all of said elongated members to pivotally extend from said generally circular edge portion of said frame and forcibly engage with said workpiece to reform the same;

(c) ceasing actuation of said driving member, thereby stopping said force applying assemblies;

(d) actuating said driving member in an opposite annular direction, thereby causing all of said force applying assemblies to retract toward said generally circular edge portion of said frame and disengage from said workpiece; and (e) removing said workpiece from its position adjacent said generally circular edge portion of said frame.

22. The method of claim 21 wherein said actuating means is comprised of a control panel, a control unit, a hydraulic network and a plurality of hydraulic actuators and the step of actuating said driving member with said actuating means to engage said force applying assemblies with said workpiece involves turning on the hydraulic control unit and depressing an engage control button on the control panel to energize the hydraulic actuators such that said driving member is rotated thereby causing said force applying assemblies to simultaneously and uniformly extend into engagement with the workpiece.

23. The method of claim 21 wherein said step of actuating said driving member involves utilizing a hydraulic system that actuates a plurality of hydraulic actuators, thereby actuating said driving member.

24. The method of claim 21 wherein said step of ceasing said actuation of said driving member further comprises engaging a retaining means to maintain the position of said force applying assemblies when said actuation was ceased.

25. The method of claim 21 wherein said step of actuating said driving member in an opposite direction involves utilizing a hydraulic system that energizes a plurality of hydraulic actuators, thereby actuating said driving member such that said force applying assemblies simultaneously retract away from said workpiece.

* * * * *